July 27, 1943.   A. ILLIANO   2,325,403
EMERGENCY TIRE LIGHTING APPARATUS
Filed Feb. 9, 1942
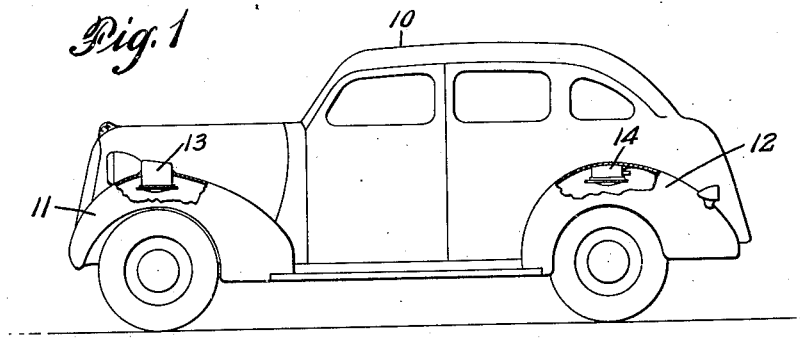
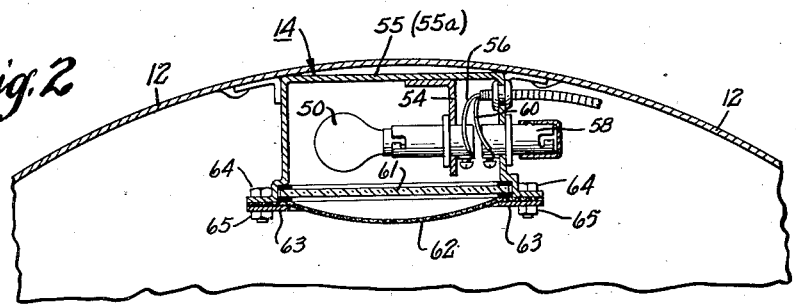
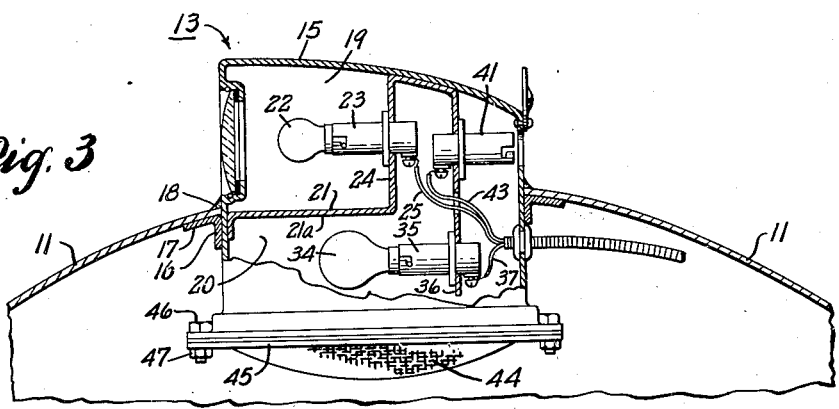
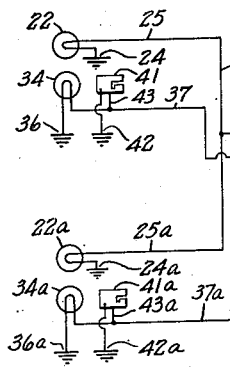
INVENTOR:
Arthur Illiano
BY H. G. Manning
ATTORNEY.

Patented July 27, 1943

2,325,403

UNITED STATES PATENT OFFICE 2,325,403

EMERGENCY TIRE LIGHTING APPARATUS

Arthur Illiano, Waterbury, Conn.

Application February 9, 1942, Serial No. 429,979

3 Claims. (Cl. 240—8.1)

This invention relates to illumination and more particularly to emergency lamps adapted to be attached to the fenders of a motor vehicle above the wheel for facilitating the change of tires or applying chains, etc. at night.

One object of the present invention is to provide an emergency tire lamp of the above nature which will throw a light below the fender—a portion of the casing thereof being located above the fender for housing a parking light.

Another object is to provide an emergency tire lighting apparatus of the above nature in which a socket is provided for selectively receiving the plug of a safety or trouble light extension cord for use to warn approaching cars that repairs are being made, or for general illumination purposes to facilitate repairs.

A further object of the above invention is to provide an emergency tire lamp of the above nature in which the control switch therefor will be located on the instrument panelboard within the vehicle adjacent the switch for controlling the parking lights.

A still further object is to provide a combined tire lamp and parking light mounted in a single casing which extends through the front fender of the vehicle, and in which a transparent cover sheet and wire screen are used to protect the tire lamp from injury.

With these and other objects in view there have been illustrated on the accompanying drawing two forms in which the invention may be conveniently embodied in practice.

In the drawing:

Figure 1 represents a side view of an automobile in which the front and rear fenders are shown in section to illustrate the appearance of both forms of emergency tire lamps when installed upon the front and rear fenders.

Figure 2 is a sectional view on a larger scale of the first form of the emergency tire lamp installed upon the rear fender.

Figure 3 is a similar sectional view of the second form of the emergency tire lamp as it appears installed upon the front fender of the car, the casing of this form of lamp also having a front parking lamp located above the fender.

Figure 4 is a diagrammatic view showing the wiring circuits of the lighting apparatus shown in Figure 3.

Referring now to the drawing in which like reference numerals denote corresponding parts throughout the several views, the numeral 10 indicates an automobile having front fenders 11 and rear fenders 12, respectively.

In order to provide illumination for the tires and wheels to facilitate the application and removal of chains, provision is made on each front fender 11 of a combined parking lamp and emergency tire lamp 13, and on each of the rear fenders 12 an emergency tire lamp 14.

Each front parking lamp and emergency lamp 13 (see Fig. 3) consists of a unitary casing 15 having an angle-shaped flange 16 secured to its outer periphery and preferably soldered thereto. The flange 16 is provided with an outwardly inclined downwardly extending web 17 which is welded or otherwise secured to the under surface of the front fender 11. The casing 15 is also secured to the top portion of said front fender 11 by a welded section 18 which extends around the periphery of the casing 15.

The casing 15 is divided into upper and lower compartments 19 and 20 (see Fig. 3) which are separated by a channel-shaped partition 21.

The upper compartment 19 serves as a housing for a parking lamp 22 carried by a socket 23 which is rigidly secured to a vertical wall 24 of the partition 21, said socket 23 being grounded in said wall 24. The lamp 22 is also connected by a wire 25 leading to a conductor 26 which is also connected to a wire 25a leading to a similar parking lamp 22a on the left side of the car, the socket of which lamp 22a is grounded at 24a.

Intermediate its ends, the conductor 26 is connected to a common conductor 27 leading to a movable contact 28 of a switch 29 which is adapted to control the illumination of the front parking lights 22, 22a. The common parking lamp switch 29 has a stationary contact 30 which is connected to a common conductor 31 leading to one terminal of a storage battery 32, the other terminal of which is grounded at 33 to the metallic body of the car.

In the bottom compartment 20 of the unitary casing 15, provision is made of an emergency tire lamp 34 which is detachably mounted in a socket 35 rigidly secured to and grounded in a rear vertical wall 36 of the partition 21. The center terminal of the lamp 34 is also connected to a wire 37 leading to a movable contact 38 of a switch 39 for selectively controlling the individual tire illuminating lamp 34 located under the right front fender 11. The switch 39 is provided with a stationary contact 40 which is connected to the battery 32 by means of the common conductor 31, previously mentioned.

In order to provide a convenient connection for the plug of a safety or trouble light extension cord to be used for warning approaching cars that repairs are being made, or for providing additional illumination for the tire repair or removing operations, provision is made of an auxiliary socket 41, the exterior of which is connected to and grounded at 42 to the rear wall 36 of the partition 21, said socket 41 being connected by a wire 43 leading to the wire 37 previously mentioned.

The combined parking lamp and emergency tire lamp located on the left-hand fender 11 is similar to that just described for the right-hand side of the car and includes a tire lamp 34a grounded at 36a to the rear portion of the partition 21a. Provision is also made of a wire 37a leading to a movable contact 38a of an individual switch 39a which serves to control the left-hand front tire lamp. A stationary contact 40a is provided an the switch 39a which is connected to the wire 31, previously mentioned.

Similarly, a trouble light socket 41a is provided at the left-hand front of the car, said socket being grounded at 42a in the rear wall 36a of the partition 21a. The socket 41a is also connected by a wire 43a to the conductor 37a previously mentioned.

The bottom of the compartment 20 on each front fender 11 may be provided with a transparent glass crystal, not shown, below which is a convex protecting wire screen 44 secured to the bottom of the casing 15 by a clamping ring 45, bolts 46, and nuts 47.

In order to control the special rear emergency tire lamp 14 located upon the rear fenders 12 of the car, provision is made of a pair of individual switches 48 and 49, respectively—the switch 48 controlling a right-hand rear tire lamp 50, and the switch 49 a left-hand rear tire lamp 50a. The switches 48 and 49 are provided with movable contacts 51 and 51a, respectively, for engagement with stationary contacts 52 and 52a, respectively, the latter of which are connected to the common conductor 31, previously described, leading to the storage battery 32. The right and left rear lamps 50 and 50a (as clearly shown in Figures 2 and 4) are grounded in a depending wall 54 secured, as by welding, to the casings 55 and 55a. The central terminals of the lamps 50 and 50a are connected by wires 56 and 56a leading to conductors 57 and 57a which are connected to the movable contacts 51 and 51a of the switches 48 and 49, respectively.

Provision is also made of safety trouble lamp sockets 58 and 58a which are grounded in rear walls 59 and 59a of the casings 55, 55a, respectively. The sockets 58 and 58a are also electrically connected to wires 60 and 60a which are joined to the wires 57 and 57a, respectively.

Each rear emergency tire light 14 on each side of the car is provided with a transparent sheet of glass or other suitable material 61 below which is a convex protecting wire screen 62 similar to the screen 44 previously mentioned, and which is connected to the casing 55, 55a by means of a clamping ring 63, bolts 64, and nuts 65.

It will be understood, if desired, that the control switches for the emergency tire lamp may be located on the fenders instead of on the instrument board, as herein illustrated, within the spirit and scope of this invention.

It will also be understood that where no fastening means are described or shown on the drawing, the connections will be assumed to be welded or soldered.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. A lighting apparatus for a motor vehicle comprising a unitary casing for connection to the front fender of said vehicle, said casing having an upper compartment extending above said fender and a lower compartment extending below it, a partition in said casing having an upstanding wall and a depending wall behind said upstanding wall, a "parking" lamp located in the forward part of said upper compartment and being supported by said upstanding wall, a "tire" lamp located in said lower compartment and being supported by said depending wall, a light emitting opening in the front of said upper compartment, a light emitting opening in the bottom of said lower compartment, and selectively-operated switch means for separately controlling said lamps independently of each other.

2. The lighting apparatus as defined in claim 1 in which said partition has a horizontal forward section, a short upstanding wall secured to said horizontal section, and a longer depending rear wall spaced from and secured to said upstanding wall.

3. The lighting apparatus as defined in claim 1, in which said rear depending wall is provided with a rearwardly-opening socket for receiving a trouble lamp plug.

ARTHUR ILLIANO.